US008660079B2

(12) United States Patent
Seok (10) Patent No.: US 8,660,079 B2
(45) Date of Patent: Feb. 25, 2014

(54) METHOD FOR SENSING WHITESPACE IN A WIRELESS LAN SYSTEM, AND APPARATUS FOR PERFORMING SAME

(75) Inventor: Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 74 days.

(21) Appl. No.: 13/393,027

(22) PCT Filed: Nov. 9, 2009

(86) PCT No.: PCT/KR2009/006546

§ 371 (c)(1),
(2), (4) Date: Feb. 28, 2012

(87) PCT Pub. No.: WO2011/030960

PCT Pub. Date: Mar. 17, 2011

(65) Prior Publication Data

US 2012/0184222 A1    Jul. 19, 2012

(51) Int. Cl.
*H04W 4/00* (2009.01)
(52) U.S. Cl.
USPC .......................................... 370/329; 370/341
(58) Field of Classification Search
None
See application file for complete search history.

(56) References Cited

U.S. PATENT DOCUMENTS

| | | | |
|---|---|---|---|
| 2008/0130519 A1* | 6/2008 | Bahl et al. | 370/254 |
| 2008/0293353 A1* | 11/2008 | Mody et al. | 455/1 |
| 2010/0195580 A1* | 8/2010 | Samarasooriya et al. | 370/329 |
| 2010/0246506 A1* | 9/2010 | Krishnaswamy | 370/329 |
| 2010/0296404 A1* | 11/2010 | Quadri et al. | 370/252 |
| 2011/0085462 A1* | 4/2011 | Qi | 370/252 |
| 2012/0300811 A1* | 11/2012 | Hu | 375/133 |

OTHER PUBLICATIONS

U.S. Federal Communications Commission, "Second Report and Order and Memorandum Opinion and Order,", Nov. 2008.
Ghasemi et al. "Spectrum Sensing in Cognitive Radio Networks: Requirements, Challenges and Design Trade-offs," IEEE Communications Magazine, Apr. 2008 pp. 32-39.
Peha, "Emerginging Technology and Spectrum policy Reform," in Proceedings of United Nations International Telecommunication Union (ITU) Workshop on Market Mechanisms for Spectrum Management, Geneva, Switzerland, Jan. 2007.
Ahuja et al. "Cognitive Radio System using IEEE 802.11a over UHF TVWS," IEEE DySPAN 2008, Oct. 2008.
International Search Report from corresponding PCT Application No. PCT/KR2009/006546 dated Oct. 6, 2010.

* cited by examiner

*Primary Examiner* — Chi Pham
*Assistant Examiner* — Soon-Dong D Hyun
(74) *Attorney, Agent, or Firm* — Morgan, Lewis & Bockius LLP (57) ABSTRACT

Provided is a method for sensing a channel of a whitespace band in a wireless LAN system. A method for sensing and reporting a channel of a whitespace band in a wireless LAN system according to one embodiment of the present invention comprises the steps of: receiving a sensing request including a candidate report channel and a target channel of a whitespace band to be sensed; sensing the target channel; and determining a channel for transmitting sensed results in accordance with whether a licensed user is detected on the target channel, and transmitting the sensed results.

10 Claims, 8 Drawing Sheets

METHOD FOR SENSING WHITESPACE IN A WIRELESS LAN SYSTEM, AND APPARATUS FOR PERFORMING SAME

This is a U.S. National Phase Entry of PCT Application No. PCT/KR2009/006546, filed Nov. 9, 2009, which claims the benefit of U.S. Provisional Application No. 61/240,665 filed Sep. 9, 2009.

FIELD OF THE INVENTION

The present invention relates to a WLAN and, more particularly, to a method of sensing a whitespace band in a WLAN system.

BACKGROUND OF THE INVENTION

There may be a frequency band in which several kinds of wireless communication systems can coexist. An example of the frequency band is TV whitespace.

TV whitespace refers to unused frequency bands remaining as residual bands owing to the digitalization of analog broadcasting. TV whitespace refers to a spectrum of 512 to 698 MHz allocated to broadcast TV.

When a licensed device is not being used in the corresponding spectrum, an unlicensed device can use the corresponding band.

If it is sought to use TV whitespace, an unlicensed device has to obtain available channels from a corresponding area by utilizing a geo-location database.

Furthermore, in order to solve a coexistence problem between unlicensed devices using TV whitespace, a signaling protocol, such as a common beacon frame, is required.

If IEEE 802.11 is used in TV whitespace, there is an advantage in that coverage is rapidly increased in terms of a spectrum.

However, in most cases, if the coverage is increased, the number of stations is also greatly increased. In this case, there may be a problem in the ability to flexibly handle an increase in the number of users (that is, scalability). Furthermore, since several wireless communication systems and several unlicensed devices coexist, a problem may occur in coexistence. In this environment, scalability may be further degraded according to a Distributed Coordination Function (DCF) and an Enhanced Distributed Channel Access (EDCA) protocol of IEEE 802.11.

The DCF is a channel access mechanism used in IEEE 802.11 and is based on Carrier Sense Multiple Access/Collision Avoidance (CSMA/CA). Furthermore, the EDCA corresponds to a contention-based medium access method, from among channel access models which have been proposed by a Hybrid Coordination Function (HCF) defined by extending the existing medium access control protocol of IEEE 802.11. Here, the HCF is a protocol defined in IEEE 802.11e proposed for QoS guarantee.

In order to overcome the above problems and to use the channels of TV whitespace band in an IEEE 802.11 WLAN system, an AP has to have information about channel environments of the TV whitespace band which is continuously changed. Accordingly, there is a need for a sensing method of an AP obtaining and updating information about the channels of TV whitespace band.

DETAILED DESCRIPTION OF THE INVENTION

Problems to be Solved by the Invention

It is an object of the present invention to provide a channel sensing method of collecting and updating pieces of information about the channels of a whitespace band so that an unlicensed user can use the channels of the whitespace band.

It is another object of the present invention to provide a channel sensing mechanism of a station at the request of an AP (Access Point) for the channels of a whitespace band and a method of adaptively determining a transmission channel of a sensing result according to a change in the situation of a channel.

Means for Solving the Problems

According to an aspect of the present invention, a method of sensing a channel of a whitespace band in a WLAN system includes receiving a sensing request, including a candidate report channel and a target channel of the whitespace band to be sensed, sensing the target channel, and determining a channel through which a sensing result will be transmitted according to whether a licensed user has been detected in the target channel and transmitting the sensing result through the determined channel.

When the licensed user is not detected in the target channel, a channel now being used may be determined as the channel through which the sensing result will be transmitted.

When the target channel is a channel now being used and the licensed user is detected in the target channel, the candidate report channel may be determined as the channel through which the sensing result will be transmitted.

The sensing request further includes a sensing report timeout, and the sensing result for the target channel may be transmitted through the channel now being used before the sensing report timeout expires.

The sensing request further includes a sensing report timeout, and the sensing result for the target channel may be transmitted through the candidate report channel after the sensing report timeout expires.

The candidate report channel may be determined by an Access Point (AP), and the candidate report channel may be determined based on information about whether each channel of the whitespace band is being used by the licensed user.

According to another aspect of the present invention, a channel sensing method in a whitespace band includes transmitting a sensing request, including a sensing report timeout, a candidate report channel, and a target channel of the whitespace band to be sensed, to an station and after transmitting the sensing request, receiving a sensing result for the target channel in a channel now being used during the sensing report timeout, and after the sensing report timeout expires, receiving the sensing result for the target channel in the candidate report channel.

According to yet another aspect of the present invention, a station includes a receiver for receiving a sensing request, comprising information about a candidate report channel and information about a target channel of a whitespace band, from an AP, a sensing unit for performing sensing for the target channel, and a transmitter for, when a licensed user is detected in the target channel, transmitting a sensing result for the target channel through the candidate report channel.

Advantageous Effects

There is provided a sensing mechanism for the channels of a whitespace band. Accordingly, a protection function for a licensed user can be maintained, a situation of the channels of the whitespace band can be continuously checked, and a channel can be moved to an available channel according to a change in the situation of the channel. Accordingly, the whitespace band can be efficiently used.

MODE FOR IMPLEMENTING THE INVENTION

Figure 1:
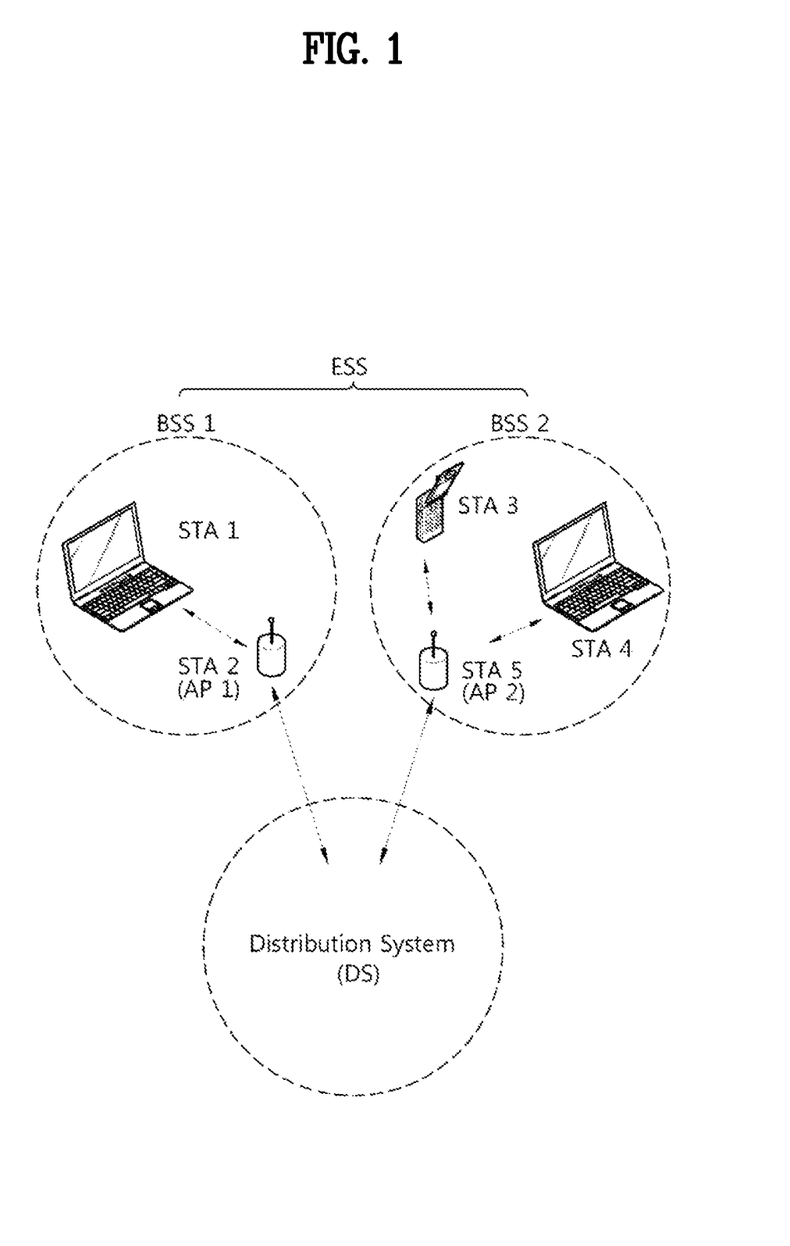
FIG. 1 schematically shows the configuration of a Wireless Local Area Network (WLAN) system to which embodiment of the present invention may be applied.

FIG. 1 schematically shows the configuration of a Wireless Local Area Network (WLAN) system to which embodiment of the present invention may be applied.

Referring to FIG. 1, the WLAN system includes one or more Basic Service Sets (BSSs). The BSS is a set of stations (STAs) which are synchronized with each other and able to communicate with each other, and it is not a concept indicating a specific area.

The BSS may be divided into an infrastructure BSS and an independent BSS (IBSS). FIG. 1 shows an infrastructure BSS.

Infrastructure BSSs BSS1 and BSS2 include one or more non-AP STAs non-AP STA1, non-AP STA3, and non-AP STA4, an AP STA1 and an AP STA2 (i.e., STAs providing distribution service), and a Distribution System (DS) for interconnecting a plurality of the AP STA1 and the AP STA2. In the infrastructure BSS, an AP STA manages the non-AP STAs of a BSS.

On the other hand, the independent BSS is operated in an Ad-Hoc mode. The IBSS does not have a centralized management entity for performing a management function at the center because it does not include an AP VHT STA. That is, in the IBSS, non-AP STAs are managed in a distributed manner. In the IBSS, all STA may be composed of mobile STAs, and they form a self-contained network because they are allowed to access the DS.

An STA is a certain function medium, including Medium Access Control (MAC) complying with the rules of the Institute of Electrical and Electronics Engineers (IEEE) 802.11 standard and a physical layer interface for a radio medium. In a broad sense, the STA includes both an AP and a non-AP STA. Furthermore, an STA capable of being operated in the TV whitespace band to be described later is called a WS STA.

A mobile terminal manipulated by a user, from among STAs, is a non-AP STA (i.e., STA1, STA3, STA4, and STA5). The STA may be simply referred to as a non-AP STA. The non-AP STA may be referred to as another terminology, such as a terminal, a Wireless Transmit/Receive Unit (WTRU), User Equipment (UE), a Mobile Station (MS), a mobile terminal, or a mobile subscriber unit. Furthermore, a non-AP STA capable of being operated in the TV whitespace band to be described later is referred to as a non-AP WS STA or simply a WS STA.

Furthermore, the APs AP1 and AP2 are function mediums for providing access to the DS via a radio medium for STAs associated with corresponding APs. In an infrastructure BSS including an AP, communication between non-AP STAs is basically performed via the AP. If a direct link is set up, however, the non-AP STAs may directly communicate with each other.

An AP may also be called another terminology, such as a centralized controller, a Base Station (BS), a node-B, a Base Transceiver System (BTS), or a site control in addition to the access point. Furthermore, an AP capable of being operated in the TV whitespace band to be described later is called a WS AP.

A plurality of the infrastructure BSSs may be interconnected through the Distribution System (DS). The plurality of BSSs interconnected through the DS is called an Extended Service Set (ESS). STAs included in the ESS can communicate with each other, and a non-AP STA can move from one BSS to the other BSS while continuing to perform communication within the same ESS.

The DS is a mechanism in which one AP communicates with the other AP. According to the DS, an AP may transmit frames to STAs associated with a BSS managed by itself, transfer frames when one STA moves to another BSS, or transfer frames over an external network, such as a wired network. The DS needs not to be necessarily a network, and it is not limited to a specific form if it can provide a specific distributed service defined in IEEE 802.11. For example, the DS may be a wireless network, such as a mesh network, or a physical structure for interconnecting APs.

AP and STAs operated in the TV whitespace have to provide a protection function for a licensed user. This is because a licensed user is given priority in using a corresponding band. The licensed user refers to a user who is given a license to use the whitespace band. The licensed user may also be referred to as another terminology, such as a licensed device, a primary user, or an incumbent user. The licensed user is used hereinafter. In the case where a licensed user, such as a microphone, uses a corresponding channel in which channel of a whitespace band, the use of the corresponding channel has to be stopped in order to protect the licensed user.

Accordingly, in using the corresponding channel, an AP and an STA must perform a procedure of checking whether the corresponding channel is available, that is, whether there is a licensed user in the corresponding channel. To check whether there is a licensed user in the corresponding channel is called channel sensing.

An AP may directly perform sensing for each of the channels of a whitespace band or may allow an STA to sense a specific channel and report a sensing result thereto, if needed. An AP checks a situation of each channel based on the sensing result. If a channel being used is no longer used according to the appearance of a licensed user, the AP moves to an available channel. If a channel being used is no longer used, an AP may previously configure a preliminary channel and inform an STA of the preliminary channel, according to circumstances.

Figure 2:
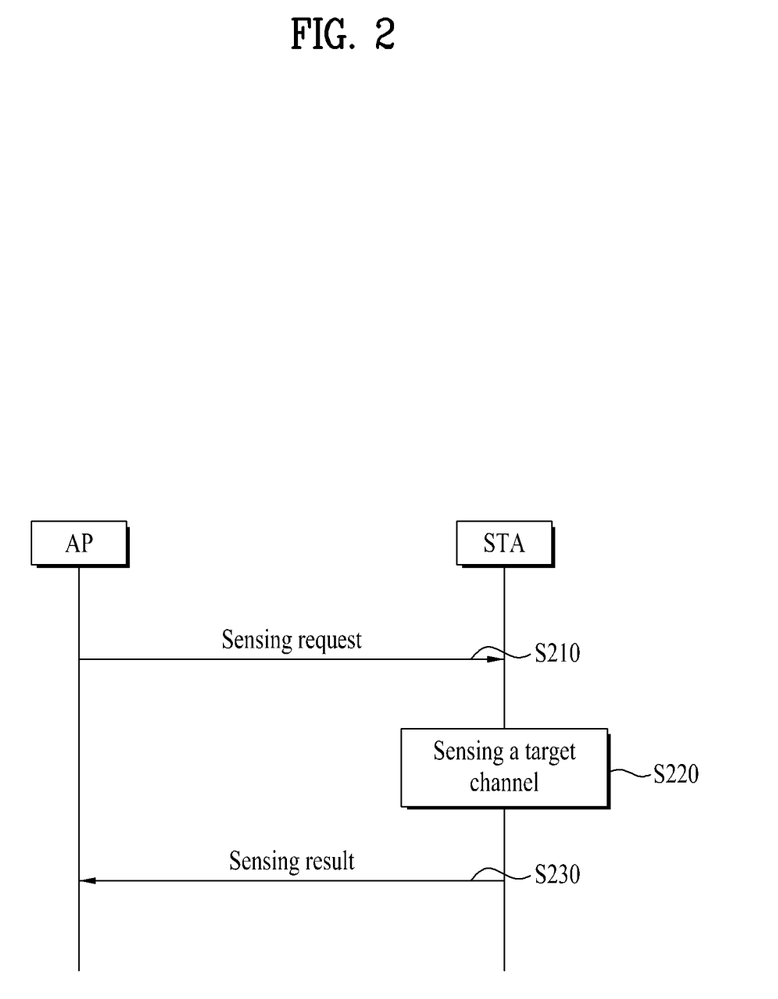
FIG. 2 schematically shows a channel sensing method according to the present invention.

FIG. 2 schematically shows a channel sensing method according to the present invention.

An STA receives a sensing request for requesting the STA to sense a specific channel of a whitespace band from an AP (S210). The sensing request may be included in a control frame or management frame, transmitted from the AP to the STA, and transmitted or may be transmitted in the form of an additional management frame for a sensing request. The sensing request includes information about a target channel. Here, the target channel refers to a channel that must be sensed by an STA. Basic information about the target channel may include a channel number, a sensing start time, and a sensing duration, and information about a candidate report channel through which a sensing result for the target channel will be transmitted. The basic information will be described in detail later.

The STA that has received the sensing request from the AP performs sensing for the requested target channel (S220). Here, an energy detection method, a signature detection method, or the like may be used as the channel sensing method. The energy detection method is a method of determining that a licensed user is using a specific channel when the strength of a received signal is higher than a specific value in the specific channel. The signature detection method is a method of determining that a licensed user is using a specific channel when the signature (e.g., a DTV preamble) of the licensed user is detected in the specific channel. The energy detection and the signature detection method are only example of a method of sensing a channel. In an embodiment of the present invention, whether there is a licensed user in a specific channel can be determined using various methods other than the above methods. How sensing for a channel is performed using which method does not influence the technical spirit of the present invention.

The STA that has performed sensing for the target channel transmits a sensing result to the AP (S230). Here, the sensing result may be transmitted through the candidate report channel included in the sensing request. The sensing result includes information about whether there is a licensed user in the target channel. The sensing result may further include information about a situation of the target channel. This is described in detail later in connection with the format of the information.

The AP can obtain information about the target channel through the above process, determine a channel to be used based on the information, and operate. Hereinafter, the operations of the AP and the STA in each of the steps, the sensing request, and the sensing result will be described in detail below in connection with their formats.

Figure 3:
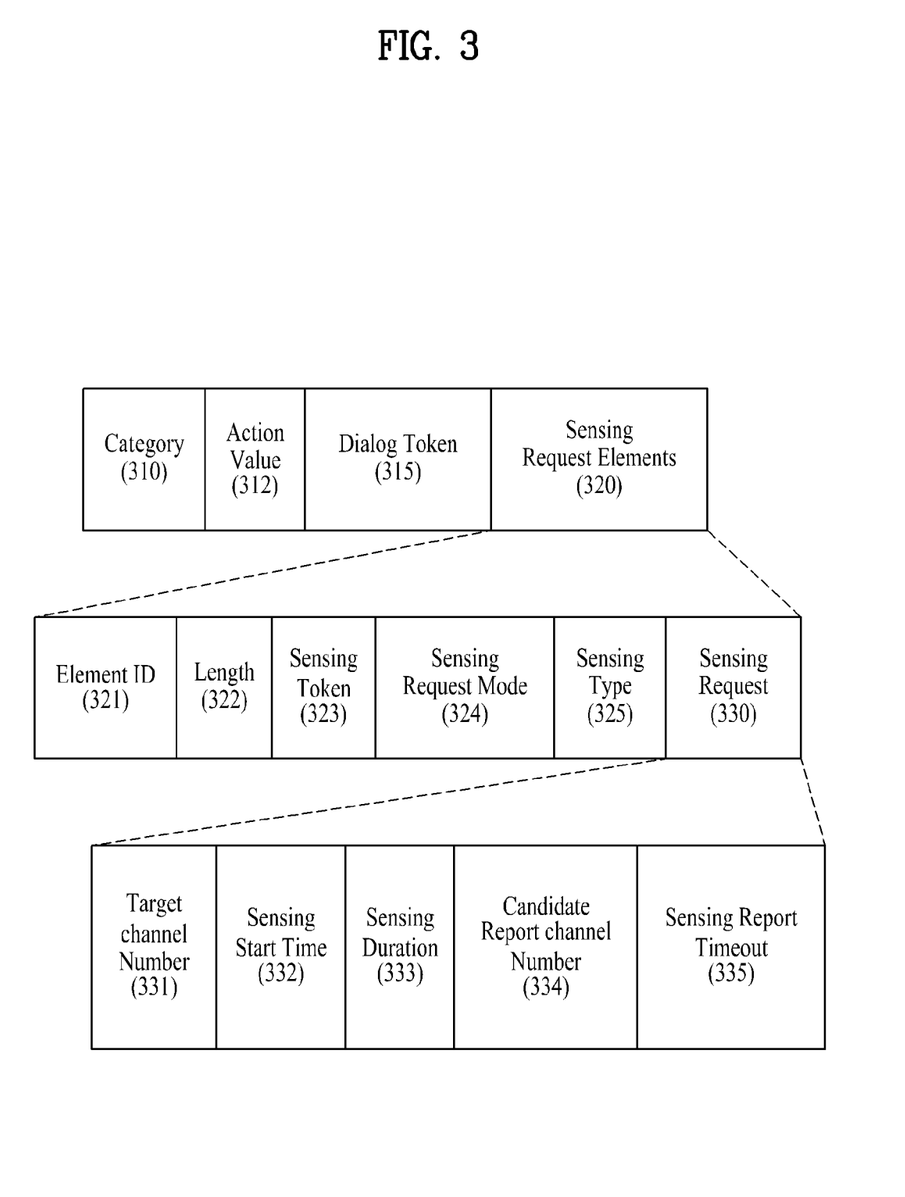
FIG. 3 is a block diagram showing the format of a sensing request according to an embodiment of the present invention.

FIG. 3 is a block diagram showing the format of a sensing request according to an embodiment of the present invention. FIG. 3 illustrates a format when an additional management frame for a sensing request is used. As described above, the sensing request needs not to be necessarily transmitted in the form of an additional management frame, and elements may be included in the existing control frame or management frame of the IEEE 802.11 standard as information elements and then transmitted.

A sensing request frame according to an embodiment of the present invention includes a category 310, an action value 312, a dialog token 315, and a sensing request element 320. The category 310 and the action value 312 simply represent the category and operation contents of a relevant frame. That is, the category 310 and the action value 312 may indicate that the relevant frame is related to channel sensing and is a control signal for requesting the channel sensing. The dialog token 315 may represent identification information for mapping with a sensing report to be transmitted later.

The sensing request elements 320 may include information elements, such as an element ID 321, a length 322, a sensing token 323, a sensing request mode 324, a sensing type 325, and a sensing request 330. The element ID 321 is used to identify a relevant element, and the length 322 indicates the length of the sensing request element 320.

The sensing request 330 includes a target channel number 331, a sensing start time 332, a sensing duration 333, a candidate report channel number 334, and a sensing report timeout 335. Here, the target channel number 331 indicates a channel to be sensed by an STA, and the sensing start time 332 and the sensing duration 333 indicate a point of time at which sensing will be started and the duration for which sensing is performed, respectively.

The candidate report channel number 334 indicates a channel through which a sensing result will be transmitted if a current channel being used is no longer used in transmitting the sensing result to an AP after an STA performs sensing for a target channel. For example, if a target channel is a channel now being used, that is, if a sensing result cannot be transmitted through a channel now being used owing to the appearance of a licensed user after an STA that is requested to sense the channel now being used performs the sensing, the STA transmits the sensing result through a channel indicated by a candidate report channel number value (i.e., the candidate report channel). The candidate report channel may be set by an AP with consideration taken of a situation of each of the channels of a whitespace band. For example, an AP may directly sense a situation of each channel of a whitespace band or may request STAs to sense channels and may set a channel in which a licensed user has not been detected when the candidate report channel was selected as the candidate report channel by taking the obtained situation of each channel of the whitespace band into consideration.

The sensing report timeout 335 indicates the time for which an AP waits in a channel now being used in order to receive a sensing result from an STA. In other words, if a sensing result is not received from an STA during the time indicated by the sensing report timeout 335, an AP considers that the STA does not transmit the sensing result through a channel now being used because a licensed user appears in the channel now being used, moves to a candidate report channel, and waits for the reception of the sensing result from the STA. Likewise, if an STA does not use a channel now being used owing to the appearance of a licensed user or does not transmit a sensing result to an AP before the time indicated by the sensing report timeout 335 expires because of the delay of transmission, the STA moves to a candidate report channel and transmits the sensing result to the AP.

Figure 4:
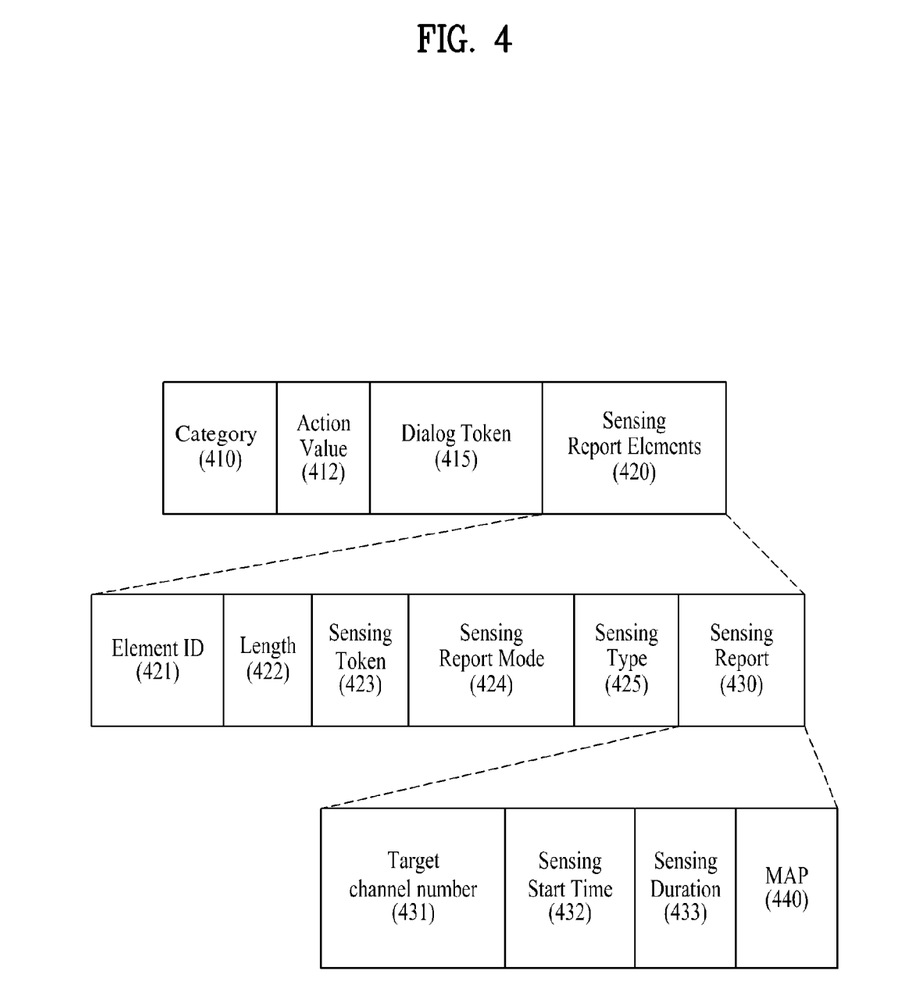
FIG. 4 is a block diagram showing the format of a sensing result frame according to an embodiment of the present invention.

FIG. 4 is a block diagram showing the format of a sensing result frame according to an embodiment of the present invention.

The sensing result frame according to the embodiment of the present invention includes a category 410, an action value 412, a dialog token 415, and a sensing report element 420. The category 410 and the action value 412 simply represent the category and operation contents of a relevant frame. That is, the category 410 and the action value 412 may represent that the relevant frame is related to channel sensing and is a control signal for a response to a sensing request. The dialog token 415 may represent identification information for mapping with the sensing request.

The sensing request element 420 may include information elements, such as an element ID 421, a length 422, a sensing token 423, a sensing report mode 424, a sensing type 425, and a sensing report 430. The element ID 421 is used to identify a relevant element, and the length 422 indicates the length of the sensing report element 420.

The sensing report 430 includes a target channel number 431, a sensing start time 432, a sensing duration 433, and a MAP 440. Here, the target channel number 431 indicates a channel on which sensing has been performed by an STA. The sensing start time 432 and the sensing duration 433 indicate a point of time at which sensing is started and a sensed duration, respectively. The MAP 440 includes a situation of a target channel checked as a result of sensing. This is described in more detail later with reference to FIG. 5.

Figure 5:
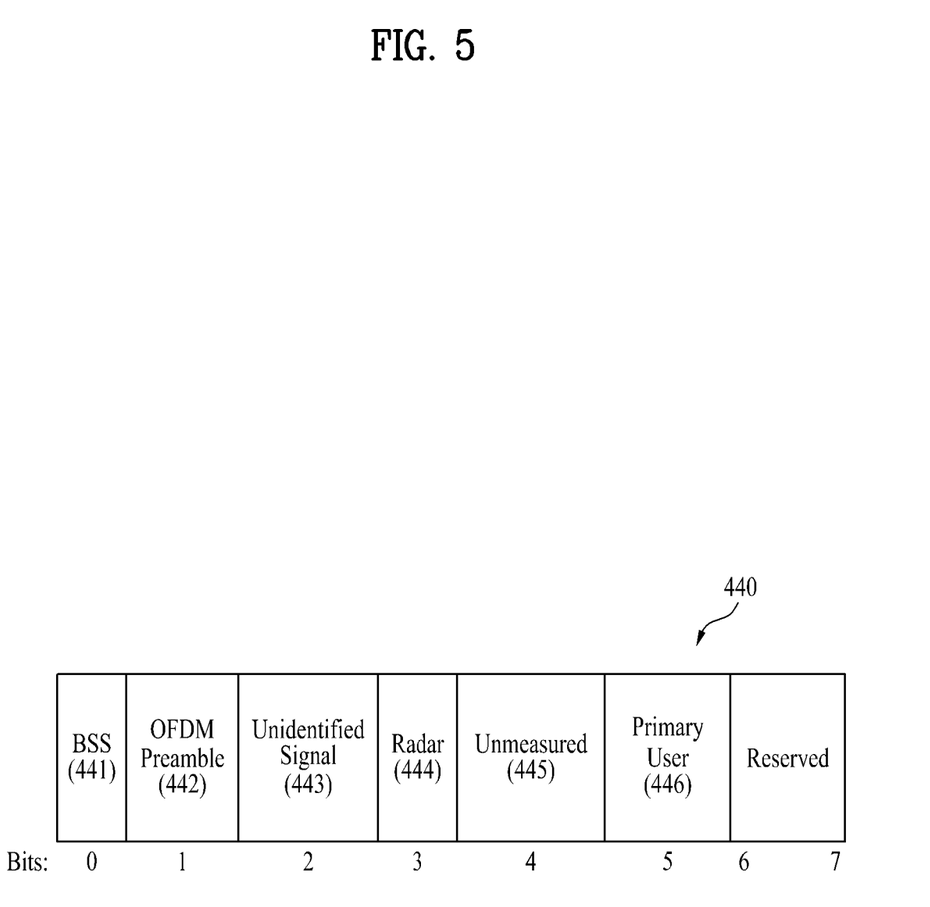
FIG. 5 is a block diagram showing the format of a MAP subfield according to an embodiment of the present invention.

FIG. 5 is a block diagram showing the format of a MAP subfield according to an embodiment of the present invention.

FIG. 5 shows information elements constituting the MAP 440 of FIG. 4. The MAP may have the length of 1 octet and includes a BSS 441 of 1 bit, an OFDM Preamble 442, an unidentified signal 443, a radar 444, unmeasured 445, and a primary user (446) bit.

The BSS (441) bit indicates whether the BSS or IBSS of IEEE 802.11 is operating or not in a target channel as a sensing result. When the BSS or IBSS is operating, the BSS (441) bit may be set to 1. When the BSS or IBSS is not operating, the BSS (441) bit may be set to 0.

The OFDM preamble (442) bit indicates whether an OFDM preamble has been detected in a target channel as a sensing result. When the OFDM preamble is detected, the OFDM preamble (442) bit may be set to 1. When the OFDM preamble is not detected, the OFDM preamble (442) bit may be set to 0.

The unidentified signal (443) bit may be set to 1 when a high power is detected in a target channel as a sensing result, but the type of a signal cannot be characterized.

The radar (444) bit indicates whether radar has been detected in a target channel as a sensing result. When radar is detected, the radar (444) bit may be set to 1. When radar is not detected, the radar (444) bit may be set to 0. The radar bit is always set to 0 in TV whitespace.

The unmeasured (445) bit is set to 1 when a channel is not sensed and set to 0 in other cases. Accordingly, when the unmeasured bit is set to 1, the remaining bits are set to 0.

The primary user (446) bit indicates whether a licensed user has been detected in a target channel as a sensing result. When a licensed user is detected, the primary user (446) bit may be set to 1. When a licensed user is not detected, the primary user (446) bit may be set to 0.

Figure 6:
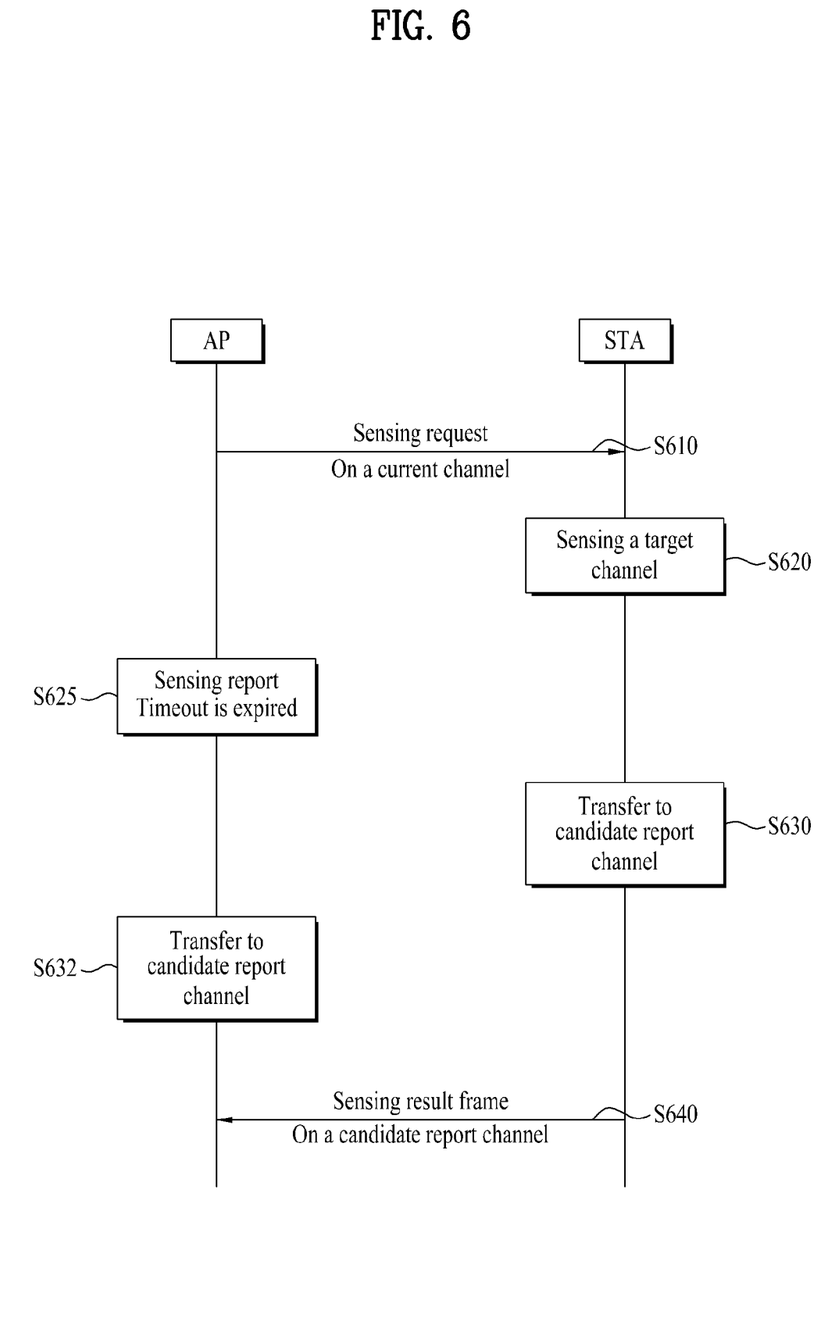
FIG. 6 is a flowchart illustrating a method of performing channel sensing according to an embodiment of the present invention.

FIG. 6 is a flowchart illustrating a method of performing channel sensing according to an embodiment of the present invention.

An STA receives a sensing request frame from an AP (S610). Here, the sensing request frame is received through a channel now being used, and the format of the sensing request frame is the same as shown in FIG. 3. That is, the sensing request frame includes information elements, such as a target channel number, a candidate report channel number, a sensing start time, and a sensing report timeout.

The STA that has received the sensing request frame performs sensing for a target channel indicated by the target channel number information element (S620). Here, it is assumed that a channel now being used is designated as the target channel and a licensed user has been detected as a sensing result of the STA. Since the licensed user has been detected in the channel now being used, the STA is unable to transmit a sensing result frame through the channel now being used. (If the sensing result frame can be transmitted through the channel now being used, the sensing result frame may be transmitted through the channel now being used.)

The STA moves to a candidate report channel in order to transmit the sensing result frame (S630). When a sensing start time is reached after transmitting the sensing request frame, the AP waits for the reception of the sensing result frame from the STA in the channel now being used until a sensing report timeout expires. In this example, since the STA cannot transmit the sensing result frame through the channel now being used because of the appearance of the licensed user, the AP cannot receive the sensing result frame from the STA in the channel now being used until the sensing report timeout expires. When the sensing report timeout expires (S625), the AP moves to the candidate report channel (S632). Next, the AP receives the sensing result frame through the candidate report channel.

Figure 7:
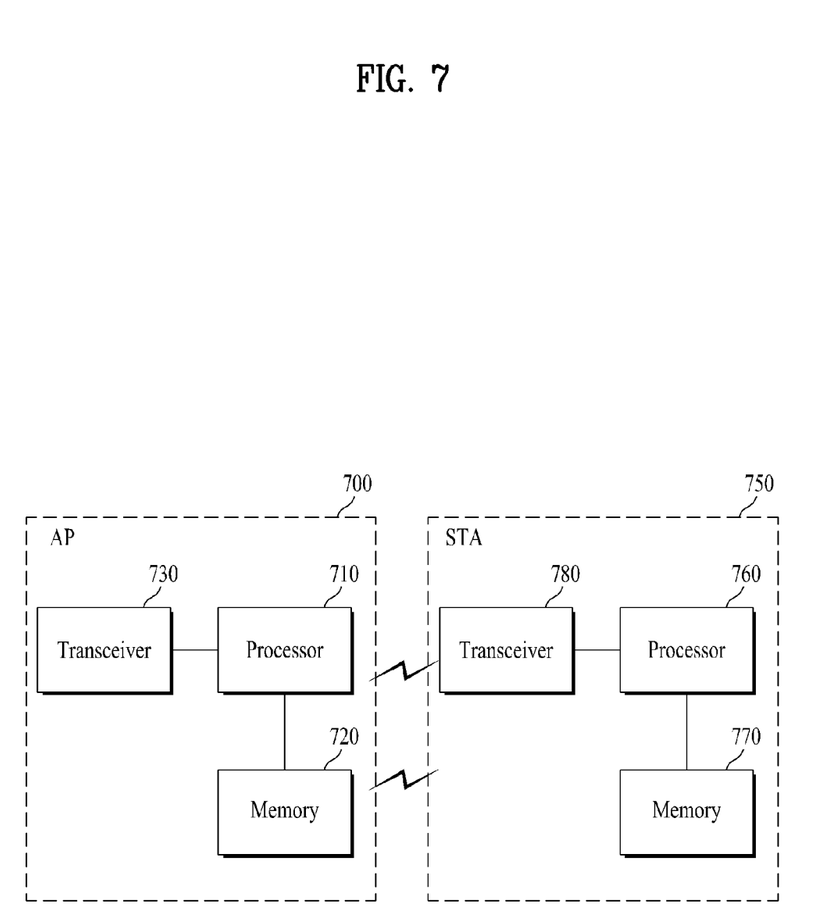
FIG. 7 is a block diagram showing wireless apparatuses according to an embodiment of the present invention.

FIG. 7 is a schematic block diagram showing the configuration of wireless apparatuses (STA, AP) in which the embodiment of the present invention may be implemented.

An AP 700 includes a processor 710, memory 720, and a transceiver 730. An STA 750 includes a processor 760, memory 770, and a transceiver 780. The transceiver (730, 780) is configured to transmit/receive a radio signal and have an IEEE 802 physical layer implemented therein. The processor (710, 760) is connected to the transceiver (730, 760) and configured to implement an IEEE 802 MAC layer. The processor (710, 760) can implement the above channel sensing method and report method. The processor (710, 760) or the transceiver (730, 780) or both may include Application-Specific Integrated Circuits (ASICs), other chipsets, logic circuits and/or data processing devices. The memory (720, 770) of FIG. 7 may include Read-Only Memory (ROM), Random Access Memory (RAM), flash memory, a memory card, a storage medium, and/or other storage devices. When the embodiment is implemented in software, the above scheme may be implemented using a module (process, function, etc.) for performing the above functions. The module may be stored in the memory (720, 770) and executed by the processor (710, 760). The memory (720, 770) may be external or internal to the processor (710, 760) and may be coupled to the processor (710, 760) through various well-known means.

Figure 8:
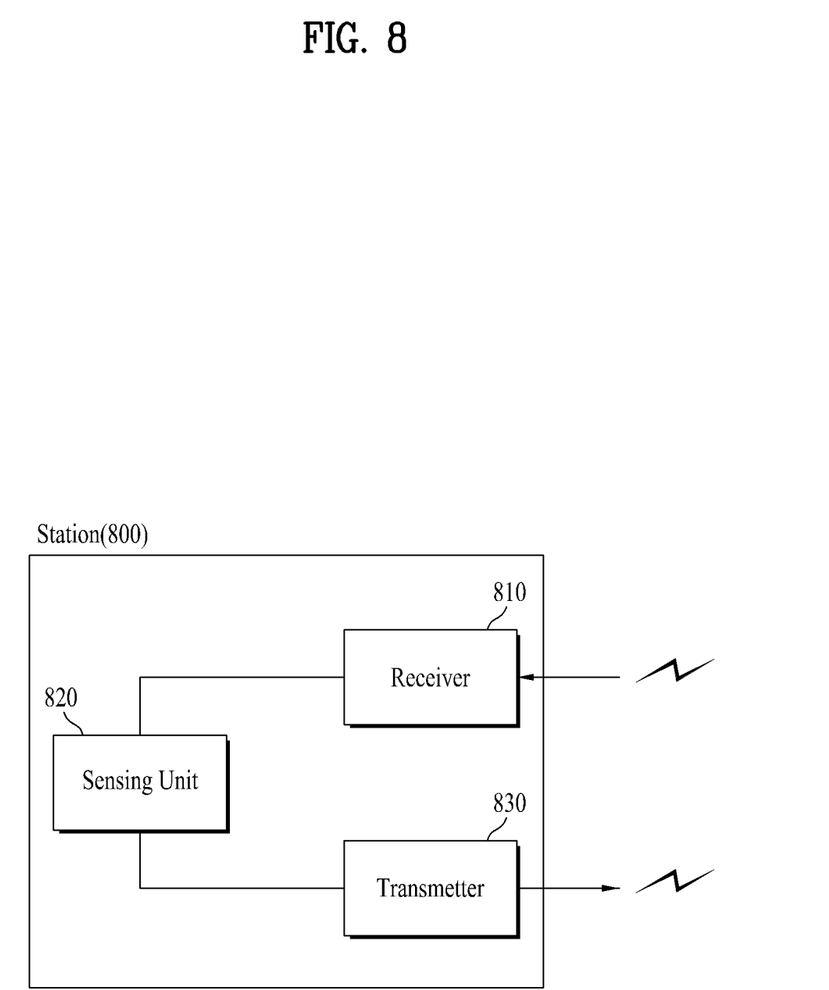
FIG. 8 a block diagram showing a wireless apparatus in which the embodiment of the present invention may be implemented.

FIG. 8 a schematic block diagram showing another example of the configuration of a wireless apparatus (STA, AP) in which the embodiment of the present invention may be implemented.

An STA 800 may include a receiver 810, a sensing unit 820, and a transmitter 830. The receiver 810 may receive a control frame, a management frame, and a data frame from an AP or another STA and process the frames. The sensing unit 820 may sense whether a licensed user, radar, and an 802.11 BSS exist in a channel using the above methods. The transmitter 830 may transmit a control frame, a management frame, or a data frame including a sensing result. The receiver 810, the sensing unit 820, and the transmitter 830 has a function for implementing the embodiment of the present invention so that the STA can implement the embodiment of the present invention.

The invention claimed is:

1. A method for transmitting a sensing result frame in a wireless local area network (WLAN) system, the method comprising:
   receiving, at a station (STA) a sensing request frame including a channel number field indicating a channel for which the sensing applies; and
   transmitting, by the STA the sensing result frame including information indicating whether a primary signal has been detected in the channel, wherein the primary signal is a signal that requires protection,
   wherein the sensing result frame field further includes an unidentified signal bit indicating whether a high power of uncharacterized type has been detected in the channel.

2. The method of claim 1,
   wherein the Primary Signal field is set to 1 when the primary signal is detected, and
   wherein Primary Signal field is set to 0 when the primary signal is not detected.

3. The method of claim 1,
wherein the sensing request frame further includes:
a start time field indicating a time point at which the sensing starts, and
a duration field indicating a duration of the sensing.

4. The method of claim 1,
wherein the sensing result frame further includes:
a channel number field indicating a channel on which the sensing is performed,
a start time field indicating a time point at which the sensing starts, and
a duration field indicating a duration over which the sensing was performed.

5. A method for transmitting a sensing request in a wireless local area network (WLAN) system, the method comprising:
transmitting, by an access point (AP) the sensing request frame including a channel number field indicating a channel for which the sensing applies; and
receiving, at the AP a sensing result frame including information indicating whether a primary signal has been detected in the channel, wherein the primary signal is a signal that requires protection,
wherein the sensing result frame further includes an unidentified signal bit indicating whether a high power of uncharacterized type has been detected in the channel.

6. The method of claim 5,
wherein the Primary Signal field is set to 1 when the primary signal is detected, and
wherein Primary Signal field is set to 0 when the primary signal is not detected.

7. The method of claim 5,
wherein the sensing request frame further includes:
a start time field indicating a time point at which the sensing starts, and
a duration field indicating a duration of the sensing.

8. The method of claim 5,
wherein the sensing result frame further includes:
a channel number field indicating a channel on which the sensing is performed,
a start time field indicating a time point at which the sensing starts, and
a duration field indicating a duration over which the sensing is performed.

9. A station for transmitting a sensing result frame in a wireless local area network (WLAN) system, the station comprising:
a receiver for receiving a sensing request frame including a channel number field indicating a channel for which the sensing applies; and
a transmitter for transmitting the sensing result frame including information indicating whether a primary signal has been detected in the channel, wherein the primary signal is a signal that requires protection,
wherein the sensing result frame further includes an unidentified signal bit indicating whether a high power of uncharacterized type has been detected in the channel.

10. An access point (AP) for transmitting a sensing request in a wireless local area network (WLAN) system, the AP comprising:
receiver for transmitting the sensing request frame including a channel number field indicating a channel for which the sensing applies; and
transmitter for receiving a sensing result frame including information indicating whether a primary signal has been detected in the channel, wherein the primary signal is a signal that requires protection,
wherein the sensing result frame further includes an unidentified signal bit indicating whether a high power of uncharacterized type has been detected in the channel.

* * * * *

UNITED STATES PATENT AND TRADEMARK OFFICE
CERTIFICATE OF CORRECTION

| | | |
|---|---|---|
| PATENT NO. | : 8,660,079 B2 | Page 1 of 1 |
| APPLICATION NO. | : 13/393027 | |
| DATED | : February 25, 2014 | |
| INVENTOR(S) | : Yong Ho Seok | |

It is certified that error appears in the above-identified patent and that said Letters Patent is hereby corrected as shown below:

On the title page, please add a new Related U.S. Application Data section as follows:

--Related U.S. Application Data

Item (60) Provisional application No. 61/240,665, filed on Sep. 9, 2009.--

Signed and Sealed this
Twenty-third Day of September, 2014

Michelle K. Lee
*Deputy Director of the United States Patent and Trademark Office*